United States Patent
Ergun et al.

(10) Patent No.: US 6,697,335 B1
(45) Date of Patent: Feb. 24, 2004

(54) QUALITY OF SERVICE ROUTING IN INFORMATION NETWORKS OVER PATHS HAVING PERFORMANCE-DEPENDENT COSTS

(75) Inventors: Ayse Funda Ergun, Lakewood, OH (US); Rakesh Kumar Sinha, Cupertino, CA (US); Yihao Lisa Zhang, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 614 days.

(21) Appl. No.: 09/626,427

(22) Filed: Jul. 27, 2000

(51) Int. Cl.[7] .................................................. H04J 1/16
(52) U.S. Cl. ........................ 370/238; 370/203; 370/231
(58) Field of Search ................................. 370/203, 229, 370/231–233, 235, 238, 238.1

(56) References Cited

U.S. PATENT DOCUMENTS

| | | | | |
|---|---|---|---|---|
| 5,233,604 A | * | 8/1993 | Ahmadi et al. | 370/238 |
| 5,274,643 A | * | 12/1993 | Fisk | 370/238 |
| 6,301,244 B1 | * | 10/2001 | Huang et al. | 370/351 |
| 6,363,334 B1 | * | 3/2002 | Andrews et al. | 703/13 |

OTHER PUBLICATIONS

R. Hassin, Approximation Schemes for the Restricted Shortest Path Problem, Mathematics of Operations Research, v. 17, No. 1 (Feb. 1992).

D.H. Lorenz, et al., Optimal Partition of QoS Requirements on Unicast Paths and Multicast Trees, INFOCOM '99.

D.H. Lorenz, et al., QoS Routing in Networks with Uncertain Parameters, IEEE/ACM Transactions of Networking.

* cited by examiner

Primary Examiner—Hassan Kiwu
Assistant Examiner—David Odland

(57) ABSTRACT

A method of determining an optimal path from a source node to a destination node over a number of links in an information network having n nodes. Each link has an associated cost-delay function, the optimal path is constrained to an overall delay of D, and a total cost of all links along the path is to be minimized at a value OPT. The method includes maintaining a range [L, U] for OPT, wherein L is a lower bound and U is an upper bound, and setting initial values for L and U. A cost value V is set corresponding to $\sqrt{U \cdot L}$, and a scaled cost c' is derived for each link wherein c' corresponds to $cn/V\epsilon$, c is an actual cost for each link, and $\epsilon > 0$. If a feasible path having a delay of at most D and a total cost of at most V is found not to exist, then the value of L is increased to V, a new cost value V is set and the link costs c' are further scaled. The values of L and U are reset until U/L<2 and a feasible path continues to exist. The links of the feasible path are then identified as the optimal path using the last-scaled link costs.

11 Claims, 10 Drawing Sheets

*FIG. 1*

(DELAY, COST)

```
EXACT
1  initialization
2      for all c ≥ 0,   set g_s(c) = 0
3      for all v ≠ s,   set g_v(0) = ∞
4  for c = 1, 2, 3, ...
5      for all e,       compute d_e(c)
6      for all v ≠ s,   set g_v(c) = min_{b:b<c} min_{u:uv∈E} {g_u(b) + d_{uv}(c-b)}
7      if g_t(c) ≤ D
8          output OPT = c and its corresponding path, exit.
```

FIG. 6

```
TEST(V)
1  initialization
2      for all c ≥ 0,   set g_s(c) = 0
3      for all v ≠ s,   set g_v(0) = ∞
4  for c = 1, 2, ... ⌈n/ε⌉
5      for all e,       compute d̂_e(c)
6      for all v ≠ s,   set g_v(c) = min_{b:b<c} min_{u:uv∈E} {g_u(b) + d̂_{uv}(c-b)}
7      if g_t(c) ≤ D
8          output OPT ≤ (1 + ε)V, exit
9  output OPT ≥ V
```

FIG. 7

```
APPROX
1  initialization
2      set L = 1
3      set U = nC
4  while U > 2L
5      set V = √U·L
6      if TEST (V) outputs OPT ≥ V,        set L = V
7      if TEST (V) outputs OPT ≤ (1 + ε)V,  set U = (1 + ε)V
```
8  set $\hat{c}_e(d) = \left\lfloor \dfrac{c_e(d)}{L\varepsilon/n} \right\rfloor$
9  call EXACT with cost $\hat{c}_e(d)$

FIG. 8

```
GREEDY (P, D)
1  set delay = D
2  while delay > 0
3      for all e ∈ P
4          set g_e = reduction in cost for adding 1 unit delay to e
5      pick e* such that g_e* = max_e(g_e)
6      add 1 unit delay to e*
7      set delay = delay - 1
```

LINK 1 HAS CONCAVITY, TOTAL COST = 17

FIG. 11

```
GREEDY WITH ROLLBACK (P, D)
1  set delay = D
2  while delay > 0
3      for all e ∈ P
4          set g_e = drop in cost for adding one unit of delay to e
5      pick e* such that g_{e*} = max_e(g_e)
6      add one unit delay to e*
7      set delay = delay - 1
8      for every e_i ∈ P, e_i ≠ e*
9          Rollback(e*, e_i, delay)

ROLLBACK(e*, e_i, delay)
1  while drop in cost for last delay on e_i < on e*
2      deallocate one unit of delay from e_i
3      set delay = delay + 1
```

*FIG. 12*

```
VARYING STEPS (P, D)
1   set delay = D
2   set logdelay = ⌊log(delay)⌋
3   for all links e ∈ P
4       COSTDROP (e)
5   set PH = heap consisting of {S_e [logdelay] : e ∈ P}
6   while delay > 0
7       set g = deletemax(PH)
8       set e*, d* = link, step size for yield g
9       add d* delay units to e*
10      set delay = delay - d*
11      COSTDROP (e*)
12      insert S_{e*} [logdelay] to PH
13      if (⌊log (delay)⌋ < logdelay)
14          set logdelay = ⌊log(delay)⌋
14          set PH = heap consisting of S_e [logdelay]

CASTDROP(e)
/* Generates data structure for link e; S_e [logdelay] is the largest yield for link e */
1   for l = 0, 1,...logdelay
2       set g_{e,2^l} = (drop in cost from adding 2^l delay to e)/2^l
3   for i = 0, 1,...logdelay
3       set S_e[i] = max_{0≤l≤i}{g_{e,2^l}}
```

|   | SIMPLE GREEDY | GREEDY W/ ROLLBACK | VARYING STEP VARIANT I | VARYING STEP VARIANT II |
|---|---|---|---|---|
| 1 | 24.3 | 16.4 | 5.0 | 0.1 |
| 2 | 27.1 | 14.5 | 3.9 | 0.4 |
| 3 | 25.7 | 14.3 | 5.0 | 0.0 |
| 4 | 20.8 | 12.2 | 3.5 | 0.0 |
| 5 | 22.3 | 9.6 | 4.0 | 0.0 |
| 6 | 17.6 | 9.1 | 3.1 | 0.0 |
| 7 | 20.4 | 10.2 | 2.2 | 0.0 |

QUALITY OF SERVICE ROUTING IN INFORMATION NETWORKS OVER PATHS HAVING PERFORMANCE-DEPENDENT COSTS

BACKGROUND OF THE INVENTION

1. Field of the Invention

This invention relates to a method of routing packets of information over paths between source and destination nodes in an information network.

2. Discussion of the Known Art

Today's Internet incorporates so-called "best effort" routing. That is, a source node in the network is connected to a destination (sink) node over a path of network links, using protocols that do not always assure a given level of service quality. For example, given the dynamic nature of Internet traffic, it is possible (and presently permitted) that packets will encounter unexpected delays. While best effort routing has been adequate for traditional applications such as File Transfer Protocol (FTP), modern applications such as real-time audio or video require strict routing performance guarantees for satisfactory transmission via the Internet.

It is contemplated that the Internet will eventually have to support various levels of quality of service (QoS) in addition to a "best effort" one. For example, each level may have its own set of service guarantees, and packets associated with certain applications may be favored over others so as to satisfy a given performance requirement for such applications. Accordingly, users of these applications may be charged more than users of applications having less stringent transmission requirements.

Several proposals have been advanced to support various forms of guaranteed service classes. See, e.g., R. Braden, et al, Integrated Services in the Internet Architecture—An Overview, RFC 1633; and Differentiated Service for the Internet, URL=diffserv.lcs.mit.edu. A core component of these proposals is the identification of a routing path for an application based on (1) QoS requirements for the application, and (2) available resources of the network.

The QoS requirements of an application are specified as either a set of path-constraints, i.e., requirements on an entire path between source and sink nodes in a network, or a set of link-constraints, i.e., requirements on individual network links that form a given path. See W. Lee, et al, Routing Subject to Quality of Service Constraints in Integrated Communication Networks, IEEE Networks (July 1995); and R. Nagarajan, et al, Allocation of Local Quality of Service Constraints to Meet End-to-End Requirements, IFIP Workshop on the Performance Analysts of ATM Systems (1993). A path with sufficient network resources to satisfy the QoS requirements of a given application is called a feasible path. Further, one or more optimization criteria may then narrow a selection among the feasible paths. A goal of QoS routing then becomes finding the optimal feasible path. See E. Crawley, et al: A Framework for QoS-Based Routing in the Internet, RFC 2386 (August 1998).

In addition to improving the performance of individual applications, QoS routing may improve overall network efficiency. See G. Apostolpoulos, et al, Quality of Service Routing—A Performance Perspective, ACM Sigcomm (1998); Z. Wang, et al, Quality of Service Routing for Supporting Multi-Media Applications, IEEE Journal on Selected Areas in Communications, 14(7) at 1228–1234 (1996); and W. Lee, et al, supra. Such gains must be weighed carefully against the complexity and cost of implementing the required QoS routing algorithms in a given network, however. Unfortunately, most QoS problems belong in a class called "multi-objective optimization", which tends to be NP (nondeterministic polynomial time)-hard. Thus, past efforts have concentrated on finding various heuristics, i.e., sub-optimal algorithms often lacking any performance guarantees, or algorithms guaranteed to be optimal only for certain special cases.

Consider a network of n nodes and m links, wherein each link has an associated cost function $c_e(d)$ representing a cost incurred by guaranteeing a delay of not more than d on link e. For a given source node s and a destination node t, an end-to-end delay constraint of D needs to be satisfied. The following two problems then arise:

1. Constrained minimum cost path (PATH): Find a path in the network from s to t, and determine how much to pay for each link of the path, in order that (a) the total delay over the path is not more than D, and (b) the total cost for all links of the path is minimized. p1 2. Constrained minimum cost partition (PARTITION): Assume a feasible s-t path P of p links has been determined. Then determine how much to pay on each link of the path in order to (a) maintain the total delay constraint D, and (b) minimize the total cost for all links.

PARTITION thus maps a path constraint of PATH into link constraints. PATH is also a generalization of the so-called restricted shortest path problem (RSP), in which each link has one fixed cost $c_e$ with fixed delay $d_e$. Both PATH and PARTITION may be solved optimally with dynamic programming. See R. Guerin, et al, QoS Based Routing in Networks With Inaccurate Information, IEEE/ACM Transactions on Networking, at 350–364 (June 1999). The running time $O(D^2m)$ is pseudo-polynomial, however. The RSP, a special case of PATH, is also NP-hard.

Approximation techniques have been given for solving RSP. See R. Hassin, Approximation Schemes for the Restricted Shortest Path Problem, Mathematics of Operations Research, 17(1) at 36–42 (February 1992)(hereafter "Hassin"), which is incorporated by reference. Hassin uses a technique called "rounding-and-scaling" to solve RSP, wherein a set of possible delay values are "scaled" down to a small enough range so that the scaled problem may be solved optimally in polynomial time. The solution is then "rounded" back to the original delay values with some bounded error.

Throughout prior studies, cost functions for each link are assumed to be convex. In D. Lorenz, QoS Routing, supra, a "greedy" approach is disclosed for obtaining optimal solutions, as well as a polynomial time $\epsilon$-approximation.

Generally, when running an $\epsilon$-approximation procedure, a value (typically $0<\epsilon<1$) is chosen which corresponds to how "close" an approximation is desired. For example, if the approximation result is to be 90% accurate, $\epsilon$ is chosen so that $1/(1+\epsilon)=0.9$, or $\epsilon \approx 0.1$. The smaller the value of $\epsilon$, the more accurate the approximation but the longer it takes to run the procedure.

Variants of the greedy approach for PARTITION with improved polynomial running time are disclosed in D. Lorenz, et al, Optimal Partition of QoS Requirements on Unicast Paths and Multicast Trees, IEEE Infocom (1999).

SUMMARY OF THE INVENTION

According to the invention, a method of determining an optimal path from a source node to a destination node over a number of links in an information network having n nodes, wherein each link has an associated cost-delay function, the optimal path is constrained to an overall delay of D, and a total cost of all links along the path is minimized at a value OPT, includes maintaining a range [L, U] for OPT, wherein L is a lower bound and U is an upper bound, setting initial values of L and U, setting a cost value V corresponding to $\sqrt{U \cdot L}$, and scaling a known cost c of each link from c to c', wherein c' corresponds to cn/V$\epsilon$, and $\epsilon$>0.

The method also includes determining if a feasible path exists having a delay of at most D and a total cost of at most V and, if no feasible path exists, then increasing the value of L and returning to the cost value setting and the link cost scaling steps, decreasing the value of U and continuing to increase the value of L until U/L<2 and a feasible path continues to exist, and identifying the links of the feasible path as the optimal path.

For a better understanding of the invention, reference is made to the following description taken in conjunction with the accompanying drawing, and the scope of the invention will be pointed out by the appended claims.

DETAILED DESCRIPTION OF THE INVENTION

Since solutions to both the PATH and the PARTITION problems described above are NP-hard, certain approximation procedures have been developed and are now described. Consider a network model N as in FIG. 1, wherein each application (data transmission) is charged a per-link price depending on a required delay guarantee. In particular, to traverse each network link, a fee is charged that reflects a desired delay guarantee on the link. Note that the cost-delay relation may differ for each link, and each link may afford more than one delay-cost option. For example, link $e_1$ in N allows a delay of either 5 time units at a cost of 10, or a lesser delay of 3 units but at a higher cost of 16. This model has been studied generally in the past. See D. Lorenz, et al, Optimal Partition, cited earlier. Such a cost-delay structure allows a setting in which a service provider can provide multiple service classes having different QoS/price levels for each class.

Network Parameters

Figure 1:
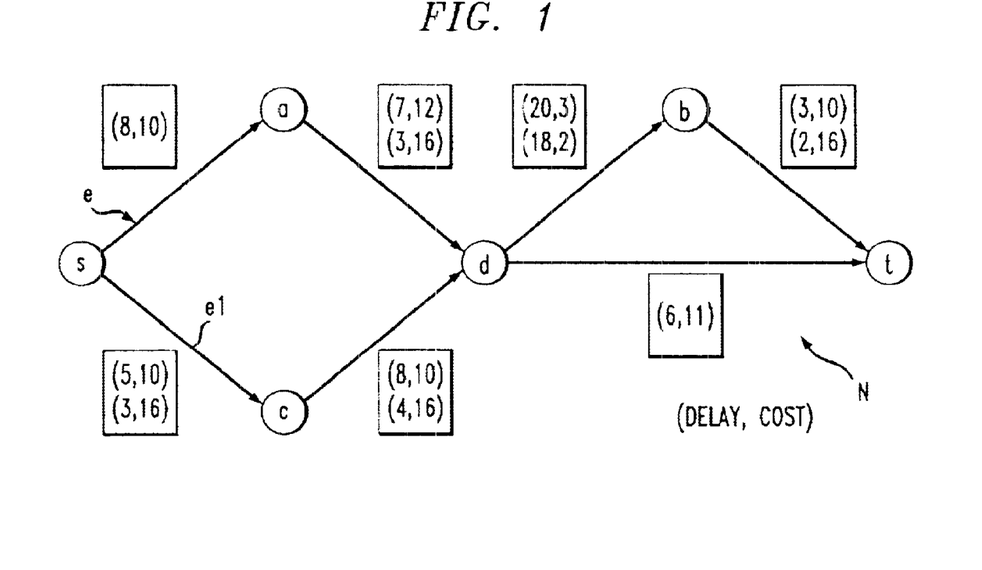
FIG. 1 is a representation of a network with a number of nodes, and links between the nodes having associated cost-delay functions.

Network N in FIG. 1 may be considered generally as a graph of n nodes and m links. Given an s-t path P, let p be the number of links on path P. Note that there are four possible paths P in FIG. 1, namely, (i) s→a→d→t; (ii) s→a→d→b→t; (iii) s→c→d→t; and (iv) s→c→d→b→t.

Each link e has an associated cost function $c_e$ such that $c_e(d)$ denotes the cost of buying a guarantee from the network service provider that link e will introduce a delay of not more than d. Note that this definition implies that $c_e(d)$ is a nonincreasing function, i.e., $c_e(d_1) \geq c_e(d_2)$ for $d_1 \leq d_2$. Assume integer delays and costs, and that the cost functions are otherwise completely unconstrained.

Given link e and delay d, the cost $c_e(d)$ can be retrieved in constant time. The function $d_e(c)$ denotes the "inverse" of $c_e(d)$ and it returns the smallest delay that incurs a cost of at most c on link e. If no delay incurs cost c, then $d_e(c)$ is infinite. For a given link e and cost c, the delay in log D time may be computed using a binary search. Unless otherwise indicated, "log" (x) connotes $\log_2(x)$.

Assume an end-to-end delay constraint D is given for transmission of packets from source node s to destination node t. Let the term OPT denote the smallest cost of an s-t path subject to the delay constraint D, which path is then considered as "optimal". Also, let C denote the maximum possible cost on any one link, i.e., $C = \max_e c_e(1)$, recalling that the minimum delay d introduced by any one link is unity.

An Approximation for PATH

Figure 2:
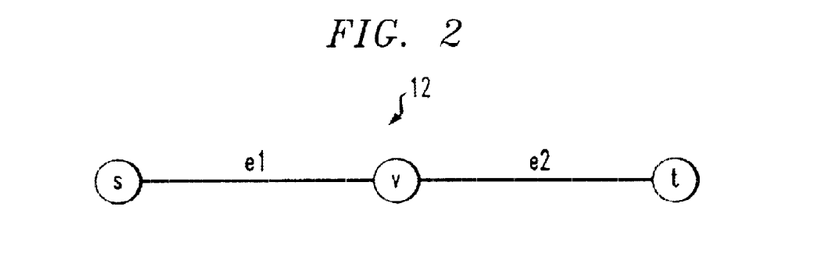
FIG. 2 is a representation of another network.

An approximation for solving the PATH problem may be derived as follows. A given network, for example, network 12 in FIG. 2, is transformed into a different network 14 as in FIG. 3, such that any optimal RSP solution for the transformed network 14 is equivalent to an optimal PATH solution for the given network 12.

Figure 3:
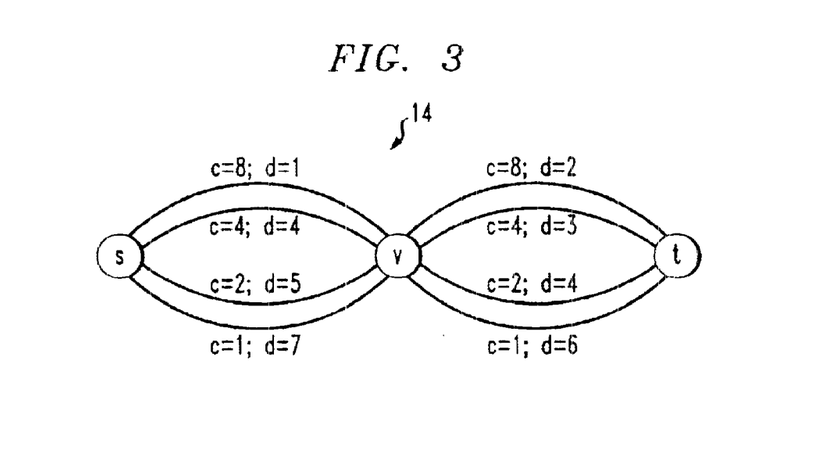
FIG. 3 is a representation of a transformation of the network in FIG. 2, for an approximation procedure to solve a PATH problem for the network of FIG. 2.
Figure 4A:
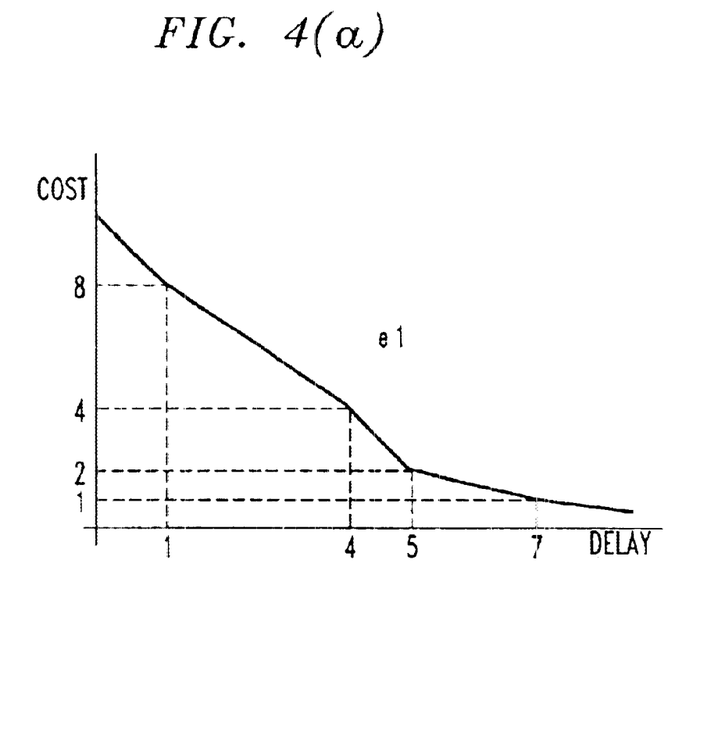
FIGS. 4(a) and 4(b) are cost-delay functions for links in the network of FIG. 2.
Figure 4B:
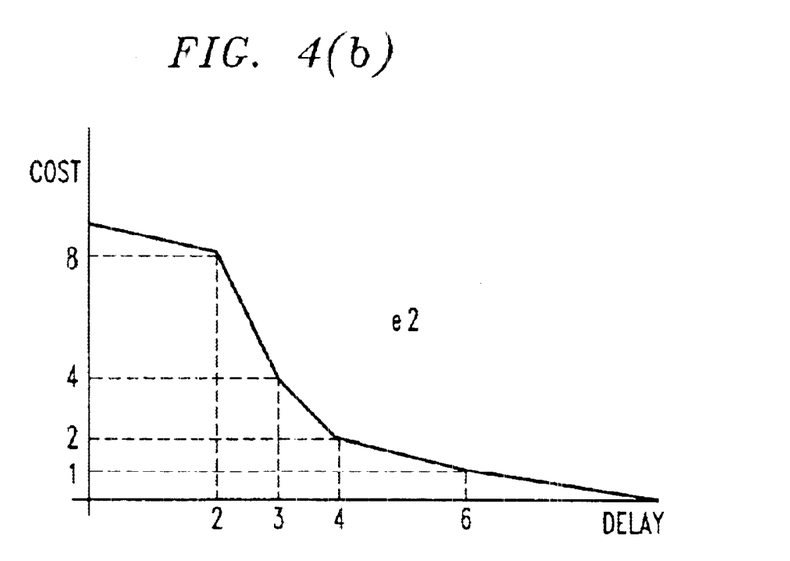

Further, assume the cost functions for links e1 and e2 of network 12 are as shown in FIGS. 4(a) and 4(b). Specifically, each link e of network 12 is replaced by D parallel links $e_1, \ldots e_D$, in network 14, where link $e_i$ has cost $c_e(i)$ and delay i. Applying Hassin's approximation for RSP to the transformed network 14, the resulting s-t path is mapped to a path in the given network 12 by replacing link $e_i$ with link e set to introduce delay i at cost $c_e(i)$. It can be verified that an $\epsilon$-approximation of PATH on the given network 12 is obtained.

The running time of this procedure has two components; namely, the time for transforming network 12 into network 14, and the time for applying the approximation for the RSP. Since each link of network 12 is replaced by D links in network 14, the time for creating network 14 is mD and the time for running Hassin's approximation is 0(D(1/$\epsilon$)mn log log U). This running time is reasonable for small D. Note also that each link e of network 12 in FIG. 2 need only be transformed into min{$c_e(1)$, D} links in network 14 in FIG. 3. This is because if $c_e(i) = c_e(j)$ for i<j, then link $e_j$ is discarded. Hence, the number of links in network 14 is m min {C, D} and the running time can be improved to 0(mD+min{C, D} (1/$\epsilon$) mn log log U). See D. Lorenz, et al, QoS Routing, cited earlier.

In the above approximation, network 14 is created such that any optimal RSP solution for network 14 is equivalent to an optimal PATH solution for the given network 12. But each link e of network 12 must be replaced with D links to obtain such a strong guarantee. A weaker guarantee on the transformation may be achieved, however, with far fewer links.

Specifically, instead of deriving all possible cost and delay pairs, the range of cost, $[1, c_e(1)]$, is subdivided into $\log_{1+\epsilon} c_e(1)$ many sub-ranges, and at most one representative is picked from each sub-range. An advantage is that a linear "blow-up" is reduced to a logarithmic one, while a disadvantage is that an entire sub-range of cost is approximated by its representative.

A goal therefore is to keep each sub-range small enough so that any cost is within $1+\epsilon$ of the representative cost in its sub-range. The approximation for RSP is then applied to this new network. As will be shown later, the transformation may introduce an error factor of $1+\epsilon$, resulting in an $(1+\epsilon)^2$ approximation. By starting with an $\epsilon'$ such that $(1+\epsilon')^2 \approx \epsilon$, an $\epsilon$-approximation is obtained.

Figure 12:
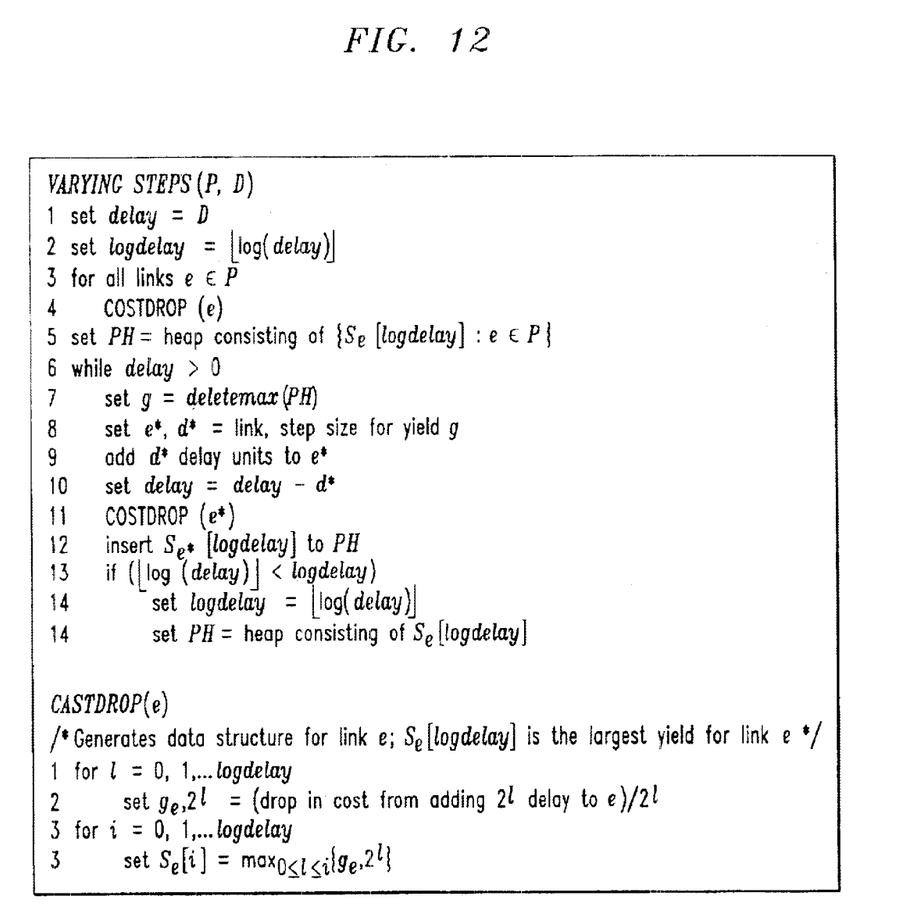
FIG. 12 represents a second heuristic for solving the PARTITION problem, according to the invention.
Figure 14:
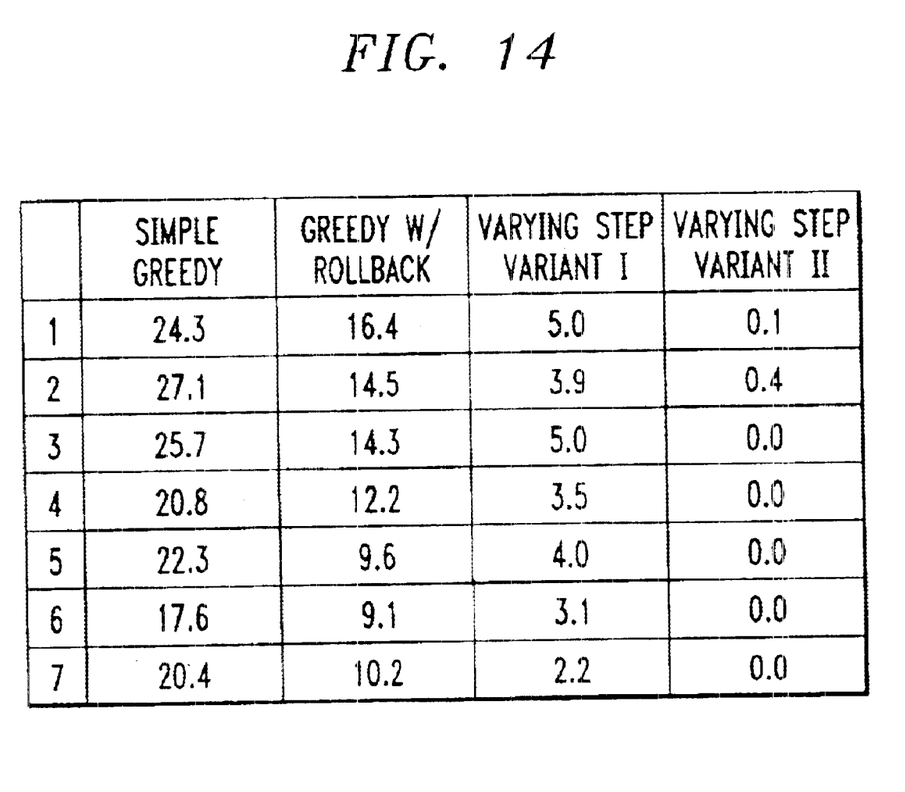
FIG. 14 is a table showing comparisons in performance among the procedures of FIGS. 8, 11 and 12.

A more precise description follows. Consider each link e in network 12 in FIG. 2, and each semi-open subrange, of the corresponding cost functions in FIGS. 4(*a*) and 4(*b*).

$$\left(\left\lceil \frac{c_e(1)}{(1+\varepsilon)^{i+1}} \right\rceil, \left\lceil \frac{c_e(1)}{(1+\varepsilon)^i} \right\rceil\right],$$

where $0 \geq i \geq \log_{1+\epsilon} c_e(1)$. The minimum delay $d_i$ is found that incurs a cost within the above range. If such a delay exists, a link in network 14 is created with delay $d_i$ and cost $c_e(d_i)$. The approximation for RSP is applied to network 14, and the resulting s-t path is mapped to a path in the given network 12.

If an exact test procedure is used for determining whether or not OPT is greater than some given value V, one could start with some upper bound U on OPT and use the procedure to do a binary search for the exact value of OPT. Because such a procedure may not be devised efficiently, an approximate version is now disclosed. Specifically, a procedure TEST is now described that determines approximately whether or not OPT is greater than some given value V. That is, TEST determines whether OPT$\geq$V, or OPT$\leq$(1+$\epsilon$)V. See FIG. 6.

Let a range, [L, U], be maintained for OPT. To approximate OPT, the gap between its upper and lower bound is repeatedly narrowed. Initially, U may be set to nC, and L can be set to 1. If TEST is applied to value $V=\sqrt{U \cdot L}$, then either the upper bound can be reduced to $V(1+\epsilon)$, or the lower bound can be increased to V. That is, after one iteration, there is a smaller range [L', U'] with $U'/L' \approx \sqrt{U/L}$. Once U is within a constant factor of L, a solution path is determined using an exact procedure with scaled costs.

An Exact Solution

To understand the procedure TEST, first consider a pseudo-polynomial time routine EXACT that produces an exact solution via dynamic programming. See FIG. 5. Let $g_v(c)$ be that minimum delay path from s to v whose total cost is c, and begin with c=0. Then compute $g_v(0), g_v(1), \ldots, g_v(c-1)$. (Line 5 of FIG. 5). Since the s-v path having minimum delay goes through some intermediate node u (where uv is a link) and accumulates some cost b up to node u, $g_v(c)$ is obtained by minimizing over all possible intermediate nodes u and all possible costs b<c.

By definition, OPT is the smallest cost of an s-t path with delay at most D. So $g_t(OPT)<D$, and for any c$\leq$OPT, $g_t(c)>D$. Therefore, the smallest cost c such that $g_t(c)$ is no more than D, is equal to OPT.

Figure 5:
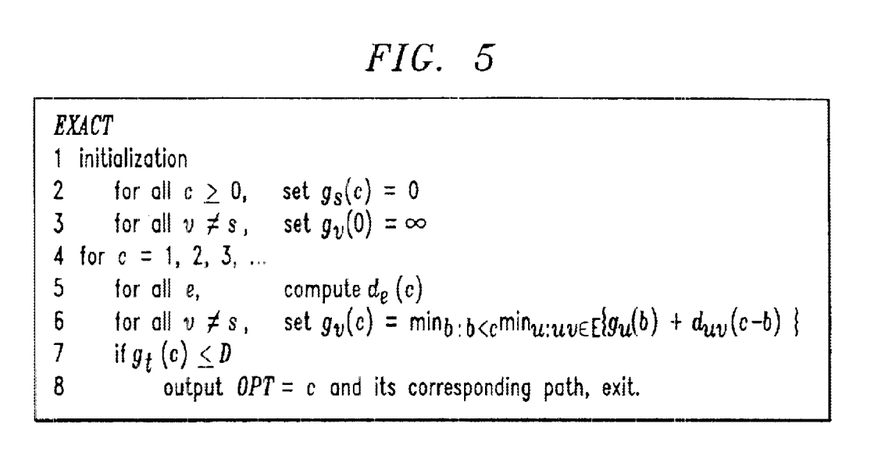
FIG. 5 illustrates an exact solution to the PATH problem for a network having cost-dependent links.

Each iteration of the "for"-loop on line 4 of FIG. 5, involves computing m instances of the function $d_e(c)$ on line 5 and a minimization over all links and all values of c on line 6. Thus, the running time of one iteration is O(mlogD+mc). The for-loop has OPT iterations, so that the overall running time is O(mOPT logD+mOPT$^2$). The routine EXACT finds the optimal cost OPT. To obtain the actual path and the delay on each link of the path, during execution of line 6 (FIG. 5) the links and the corresponding delays that yield the minimum cost can be recorded. The same may therefore be done when running an approximation procedure for PATH that incorporates EXACT.

The TEST Procedure

Figure 6:
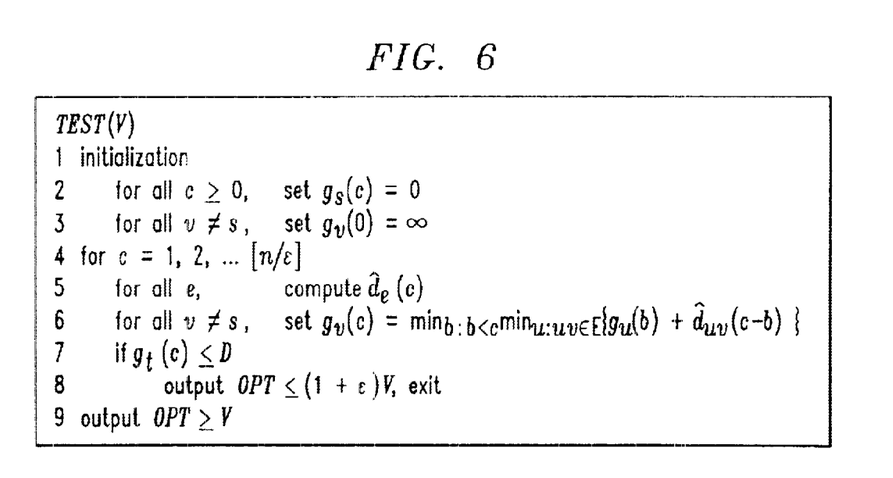
FIG. 6 illustrates a test procedure used in a polynomial-time approximation for solving the PATH problem, according to the invention.

A polynomial-time $\epsilon$-approximation test routine TEST is now described, referring to FIG. 6. The procedure TEST approximately determines if a given value V is greater than OPT, and it incorporates a rounding-and-scaling technique. The procedure TEST resembles EXACT in FIG. 5, except that the costs $c_e(d)$ are scaled down by a factor of V$\epsilon$/n, and the for-loop of line 4 in TEST is executed for c=1, 2, ..., $\lceil n/\epsilon \rceil$ only. If a path having delay of at most D is found for some c$\leq \lceil n/\epsilon \rceil$, then TEST outputs OPT$\leq$(1+$\epsilon$)V; otherwise TEST outputs OPT$\geq$V.

The scaled down cost and its inverse are denoted by $\hat{c}_e(d)$ and $\hat{d}_e(c)$, respectively. In particular, $\hat{c}_e(d) = \lfloor c_e(d)/V\epsilon/n \rfloor$, and $\hat{d}_e(c)$ returns the smallest delay that incurs a cost of at most c on link e, under the cost function $\hat{c}$. It takes constant time to compute $\hat{c}_e(d)$, and it takes log D time to compute $\hat{d}_e(c)$. It can be shown that since TEST is an $\epsilon$-approximation test, its running time is bounded by O((n/$\epsilon$) m logD+(n$^2$/$\epsilon^2$)m).

Figure 7:
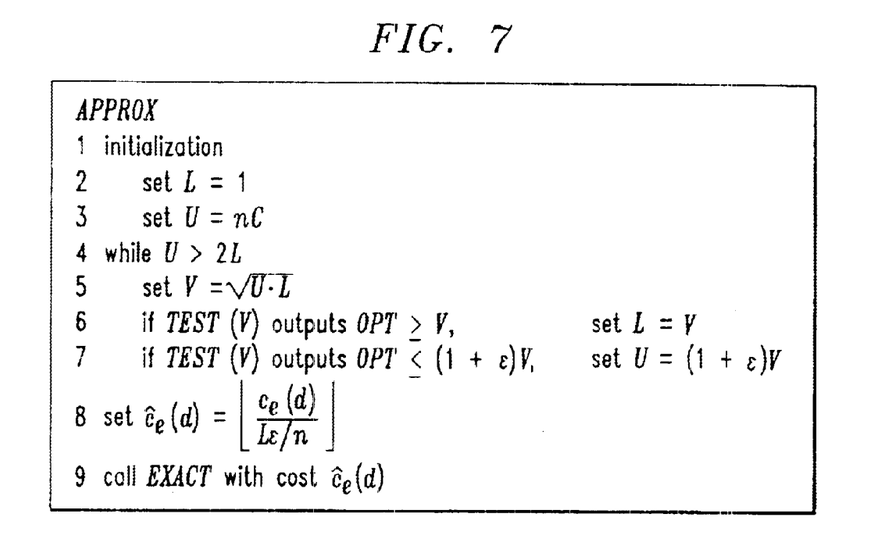
FIG. 7 illustrates the polynomial-time approximation incorporating the test procedure of FIG. 6, according to the invention.

FIG. 7 represents an $\epsilon$-approximation routine APPROX. The running time for APPROX is the summation of the running time of EXACT (line 9 of FIG. 7), and the running time of TEST (inside the while loop in FIG. 7). It can be shown that the running time of EXACT is O ((n/$\epsilon$) mlogD+ (n$^2$/$\epsilon^2$)m). The procedure TEST is executed loglogU times and each execution takes time O((n/$\epsilon$) mlogD+(n$^2$/$\epsilon^2$)m). Thus, the overall running time of APPROX is O((n/$\epsilon$)) mlogD+(n$^2$/$\epsilon^2$)m) loglogU).

The PATH problem for network N in FIG. 1 may therefore be solved using the APPROX procedure, per the following example.

EXAMPLE 1

Given network N in FIG. 1, find the least expensive path from node s to node t with a delay of at most 20.

Let $\epsilon$=0.1. Initially, we set the lower bound L to 1 and upper bound U to nC, where n is the number of nodes in the graph (6) and C is the highest cost (16).

First, $V=\lceil \sqrt{LU} \rceil = \lceil \sqrt{96} \rceil = 10$.

We scale the cost of each edge from c to c' using the following formula: $c' = \lfloor cn/V\epsilon \rfloor$. Then we run the Test procedure on the scaled weights. For this V, test returns that there is no feasible solution.

Thus, we set L=10, U is still 100.

New $V=\lceil \sqrt{LU} \rceil = \lceil \sqrt{1000} \rceil = 32$.

We scale the costs this time using V=32, and run the Test procedure. This time the procedure returns the result that a feasible solution exists. Thus, there is a feasible solution with cost at most 32(1+$\epsilon$), which is less than 36.

Now we set U=36. L is still 10.

New $V=\lceil \sqrt{LU} \rceil = \lceil \sqrt{360} \rceil = 19$.

We scale costs again with V=19, run Test procedure. Test returns no feasible solution, thus the solution must be above 19.

We set L=19. U is still 36. Thus, U/L<2. This is when we stop running the Test procedure.

We now run the final phase of the algorithm (the EXACT function) with scaled costs. This time the each cost will be scaled to c' as $c' = \lfloor cn/L\epsilon \rfloor$. The EXACT procedure finds a feasible path s, c, d, t with delays 5, 8, 6 (total 19) and total cost 31. We return this as our answer.

The above $\epsilon$-approximation procedures yield an overall path cost that is within a factor of (1+$\epsilon$) of optimal (minimum) path cost. The parameter $\epsilon$ thus allows a trade-off between the run time and the "goodness" of the approximation. Because a running time polynomial in $1/\epsilon$ guarantees a solution within a factor of $(1+\epsilon)$ of optimal, the performance of the procedures can be fine-tuned by choosing an appropriate $\epsilon$.

Heuristics for PARTITION

Certain $\epsilon$-approximation procedures were described above with respect to the PATH problem. Several heuristics for the PARTITION problem are now described. Although these heuristics have no performance guarantees, simulations have shown that they work well both in terms of running time and performance.

Figure 8:
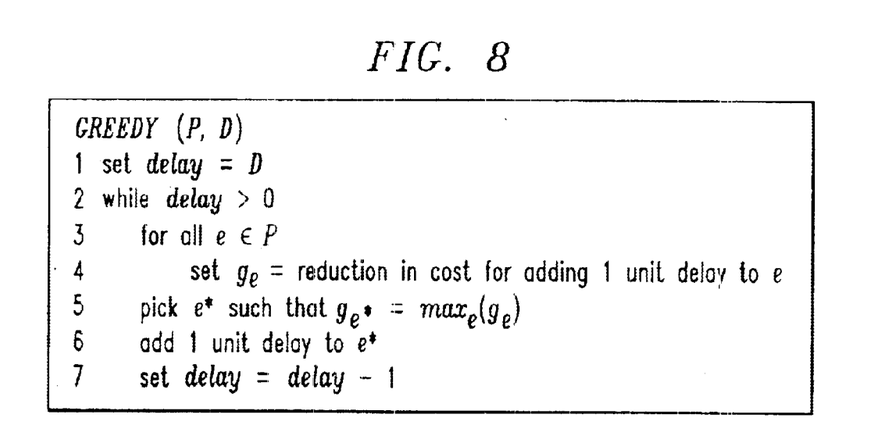
FIG. 8 represents a "greedy" procedure for solving the PARTITION problem.

Let P be a chosen s-t path with an end-to-end delay constraint D, and let p be the number of links on path P. A so-called "greedy" algorithm used in both of the earlier-cited articles by Lorenz, et al., is represented in FIG. 8. One unit of delay is initially assigned to each link along path P, thus achieving very low delay, but very high total cost. In each iteration of the "for"-loop after line 3 in FIG. 8, one unit of delay is added to that link which causes a largest reduction in total cost.

Figure 9:
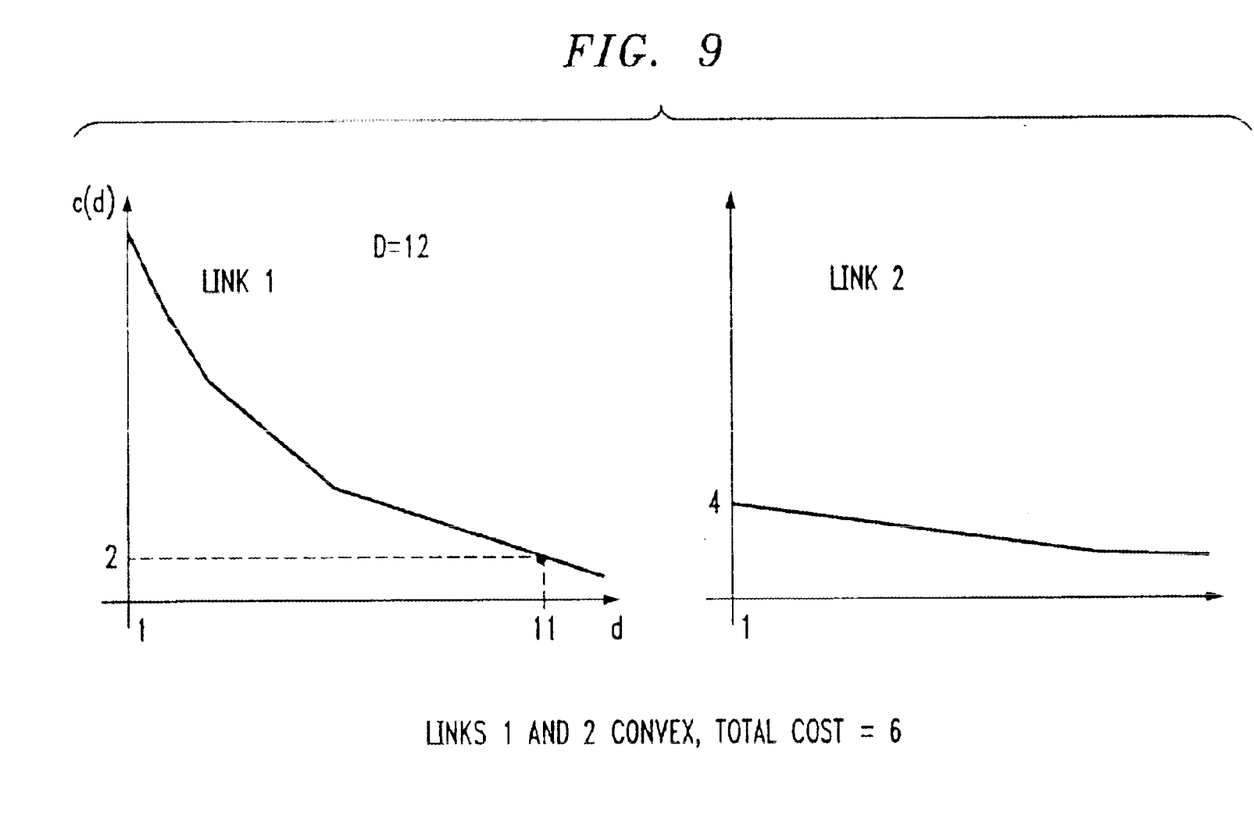
FIG. 9 shows a first set of cost-delay functions for two links of a given network.
Figure 10:
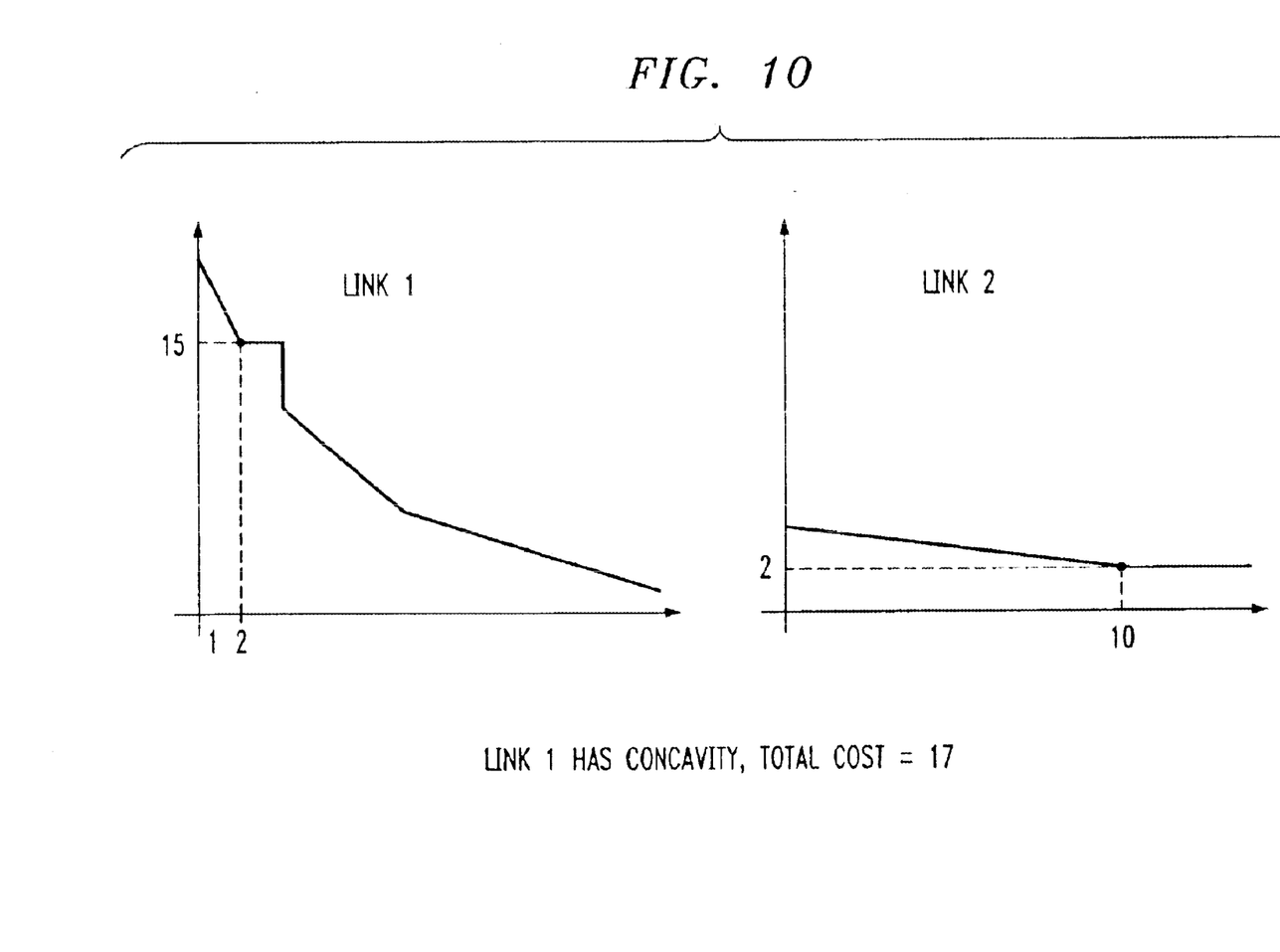
FIG. 10 shows a second set of cost-delay functions for the two links of the given network.

The greedy algorithm returns an optimal solution only if the cost function $c_e(d)$ on every link is convex, however. A function is "convex" if its slope is nondecreasing. A function is "concave" if its slope is nonincreasing. The algorithm is highly sensitive to even the slightest concavity. For example, consider a path with two links $e_1$ and $e_2$ and a delay constraint D=12. First assume the cost functions for $e_1$ and $e_2$ are convex, as shown in FIG. 9. Then assume the function for $e_1$ has a slight concavity, while the function for $e_2$ is convex throughout, as shown in FIG. 10.

For the first instance, the greedy algorithm allocates eleven units of delay to link 1, and one unit of delay to link 2 for a total cost of 6. For the situations in FIG. 10, the algorithm allocates two units to link 1 and ten units to link 2 for a total cost of 17. The optimal solution for both cases is in fact the same as for the links in FIG. 9. This example can be modified to show that the "greedy" solution can yield results arbitrarily worse than optimal.

While it is realistic to expect that cost functions for network links are typically convex, cost functions generally may at times incur instances of nonconvexity. The following heuristics make no assumption concerning convexity.

Heuristics

The greedy algorithm of FIG. 8 always makes a locally optimal choice. For partially non-convex cost functions, some locally non-optimal choices may need to be made in order to reach a globally optimal solution. Below, two heuristics which try to rectify the "one step look-ahead" property of the greedy algorithm, are described. Both start by assigning one unit of delay to each link (at a high cost) and proceed by adding a delay to selected links (thus reducing price) until all D units of delay are allocated.

Figure 11:
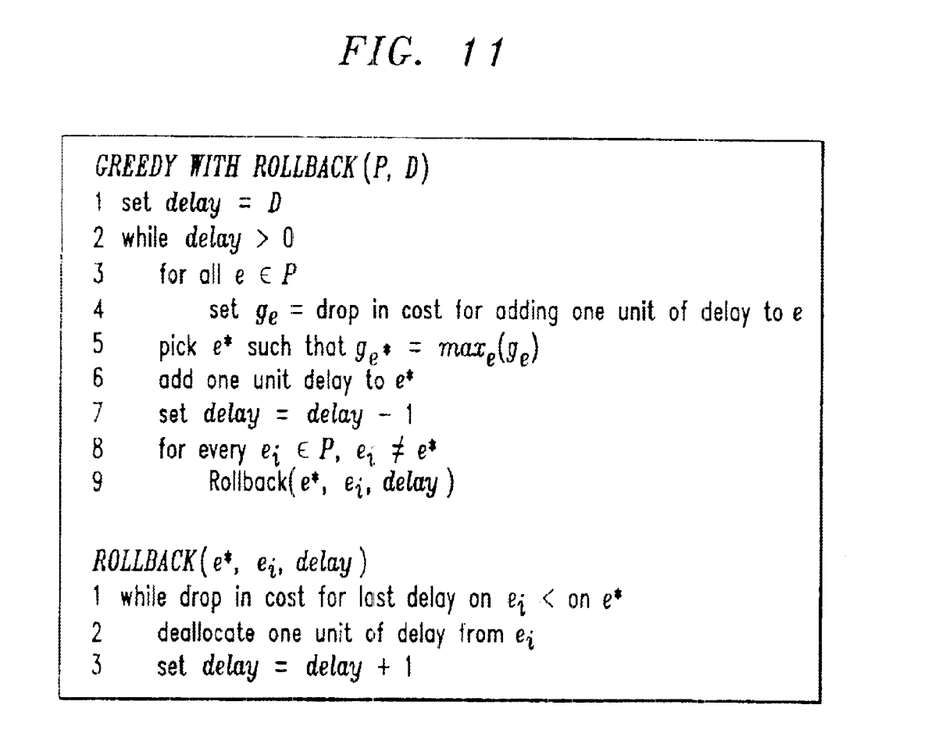
FIG. 11 represents a first heuristic for solving the PARTITION problem, according to the invention.

The first heuristic, represented in FIG. 11, differs from the greedy approach in that it is a back-tracking procedure. It continues adding single delay units to links in a greedy fashion until it determines that a mistake has been made, whereupon it cancels some of the most recent additions.

The second heuristic, represented in FIG. 12, considers the effect of adding delays in "chunks" of various sizes rather than single units, and picks a link and a chunk size which will cause a largest cost reduction per delay unit. That is, instead of considering what is optimal for one step, the heuristic considers what is optimal for one step, two steps, four steps and so on.

Greedy Heuristic With Rollback (FIG. 11)

The first heuristic uses backtracking; it proceeds "greedily" by always adding one unit of delay to that link which offers the largest cost reduction per delay unit. If, however, the per delay unit cost reduction (say g) due to a current delay. allocation is greater than the previous reduction (meaning that a concave region is reached), the heuristic checks every link and performs a sub-routine ROLLBACK where possible.

Specifically, ROLLBACK comprises removing delay units from each link until a delay unit that resulted in a cost reduction of at least g, is reached. As a result, recent bad choices are removed to make room for future good choices. Note that if all cost functions are convex, no rollbacks occur and the heuristic of FIG. 11 proceeds similarly to the "greedy" procedure of FIG. 8. Although the number of rollbacks may be large in a worst case, simulations performed suggest that rollbacks will happen only infrequently over many scenarios.

Variable Step Size Heuristic (FIG. 12)

The second heuristic allows an allocation of delay in sizes greater than a single unit during a single iteration. A "best" link and a "best" delay increment are chosen, where "best" is defined as the greatest cost reduction per delay unit. The reason is that if a portion of a link's cost function curve offers a large per delay unit cost reduction, one wants to ensure that choices are not being made based on an earlier portion of that curve. In addition, allocating delays in large chunks has the advantage of allowing the second heuristic to run faster than the first.

For every iteration, the cost reduction per delay unit, for different delay allocation sizes for each of the p links, is calculated. Two variants are considered. In the first, the delay allocations are all possible powers of 2, and, therefore, at most log D of them are computed. In the second variant, all possible delay allocations between 1 and D, are considered. FIG. 12 shows the first variant of the second heuristic.

To consider the running time of the first variant, and for simplicity, temporarily ignore ensuring that d* is at most delay (lines 13–15) of FIG. 12. The sub-routine COSTDROP(e) calculates log D per delay unit cost reductions for each link e, and stores the maximum of these in $S_e$ [logdelay]. Its running time is O(logD). PH is a heap comprising maximum possible reductions for each link e. Building the heap PH initially (lines 3–5) involves p invocations of COSTDROP and a build-heap procedure on p elements, which takes O(p logD+p)=O(p logD) time. In each iteration of the while-loop (line 6), a delay allocation is performed on the link with largest possible cost reduction. This involves two heap operations and one COSTDROP. Therefore, the running time per iteration is O(log p+log D). If D' is the number of iterations of the while loop, then the running time (ignoring lines 13–15) is O(p logD+D'(log D+log p)).

To ensure that d* is at most delay (lines 7–10), extra work is needed every time delay is dropped across a power of 2 (lines 13–15). In particular, some of the elements in PH may correspond to delays that are no longer valid, i.e., greater than a current value of delay. Thus, the maximum valid cost reduction per delay unit for each link is found, and the heap PH is rebuilt with these new reduction values. Each execution of lines 13–15 takes time O(p) and this is repeated at most log D times over the course of the procedure. Thus, the running time is O(p log D+D'(log D+log p)).

Since D'≦D, the worst case running time is O(p log D+D(log D+log p)). This bound is pessimistic, however. If the curve contains concave regions, then D' can be much smaller than D. For an extreme case in which the curves are purely concave, D' can even be constant. If the expected delay allocation per step is about 2D/logD, i.e., the average of all possible step sizes, then D' is expected to be $O(\log^2 D)$ and the running time is $O(\log D(p+\log p \cdot \log D+\log^2 D))$.

For the second variant of the second heuristic, the running time becomes $O(D(p+D'))$. The worst-case running time is $O(pD+D^2)$; and the expected time is $O(pD+D \log D)$.

It is noted that other choices of step sizes are possible, for example, the step sizes may be delays corresponding to costs of 1,2,4, . . . In this case, at most log C values are computed per link, where C is a highest cost on any link. The following example applies the first and the second heuristics, and the "greedy" procedure, to solve the PARTITION problem for a path having links 1 and 2.

EXAMPLE 2

Figure 13:
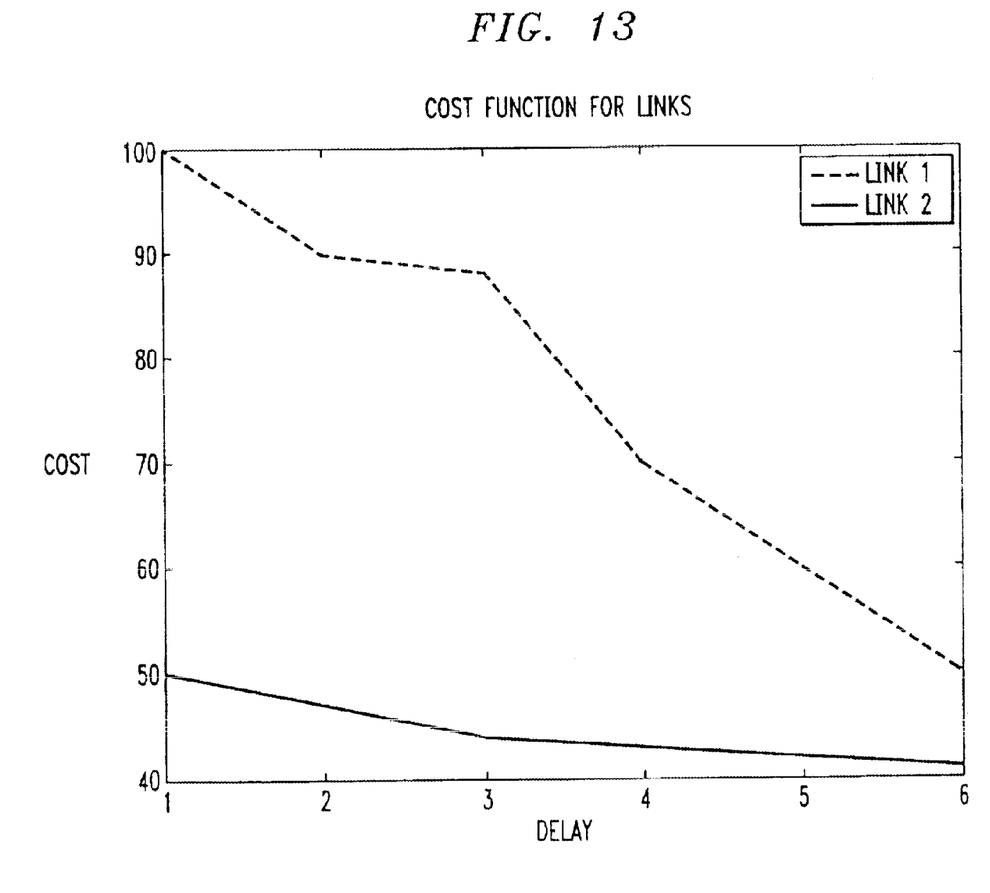
FIG. 13 is a graph of cost-delay functions for two links of a given network.

Cost functions for links 1 and 2 are shown in FIG. 13. Assume a total delay constraint of D=7. As shown below, both the first and the second heuristics obtain a total cost of 100 to satisfy D=7. The simple "greedy" approach yields a total cost of 114 for the same delay constraint, however. Initially all procedures begin with delay=1 on link 1 with cost=100, delay=1 on link 2 with cost 50.

Procedure steps:

| Step | Link picked | reduction in cost | total delay so far | |
|---|---|---|---|---|
| | | 1. Greedy with rollback: | | |
| 1 | 1 | 100 -> 90 | 3 | |
| 2 | 2 | 50 -> 47 | 4 | |
| 3 | 2 | 47 -> 44 | 5 | |
| 4 | 1 | 90 -> 88 | 6 | |
| 5 | 1 | 88 -> 70 | 7 | |
| 6 | roll back steps 2 and 3. link 2 has delay 1. | | 5 | |
| 7 | 1 | 70 -> 60 | 6 | |
| 8 | 1 | 60 -> 50 | 7 | |
| total cost = 50 on link 1 + 50 on link 2 = 100. | | | | |
| | | 2. Greedy with variable step sizes: | | |
| 1 | 1 | 100 -> 60 | 6 | (step size = 4) |
| 1 | 1 | 60 -> 50 | 7 | (step size = 1) |
| total cost = 50 on link 1 + 50 on link 2 = 100. | | | | |
| | | 3. Greedy (Simple) | | |
| 1 | 1 | 100 -> 90 | 3 | |
| 2 | 2 | 50 -> 47 | 4 | |
| 3 | 2 | 47 -> 44 | 5 | |
| 4 | 1 | 90 -> 88 | 6 | |
| 5 | 1 | 88 -> 70 | 7 | |
| total cost = 70 on link 1 + 44 on link 2 = 114. | | | | |

Simulation Results

The table of FIG. 14 summarizes simulation results. All experiments were run on a path of 30 links, with D=250. Each group of experiments 1–7 is an average of 100 runs of different cost functions. Each group aimed to test cost functions with different shapes; the cost functions for the earlier groups tended to have more alternating convex/concave regions than the later groups. The actual cost functions were generated randomly with given expected sizes for the convex/concave regions. Each numerical entry in the table shows the percentage error for the corresponding heuristic, wherein the percentage error was calculated with respect to a difference between the initial cost and the optimal cost. This error measurement does not affect the relative performance of the heuristics.

As seen in FIG. 14, the relative performance of the first and the second heuristics remained largely unaffected by the shapes of the curves. Both variants of the second heuristic with varying step sizes consistently performed better than the first heuristic. The trade-off between running time and performance of variants I and II of the second (varying step) heuristic can be observed. Variant II has near-optimal performance, and its running time was better than a straightforward dynamic programming approach as shown earlier. The simple greedy approach (without rollback) is unable to reach global optimality due to its local choices, however.

Similar results were observed for simulations on paths of different lengths. As noted earlier, the first heuristic and both variants of the second heuristic will also yield optimal solutions for links with purely convex cost-delay functions.

While the foregoing description represents preferred embodiments of the invention, it will be obvious to those skilled in the art that various changes and modifications may be made, without departing from the spirit and scope and the invention pointed out by the following claims. For example, in addition to link costs incurred over a path in a network, the disclosed methods may be applied to any additive or logarithmically additive link functions such as, e.g., probability of loss.

We claim:

1. A method of determining an optimal path from a source node to a destination node over a number of links in an information network having n nodes, wherein each link has an associated cost-delay function and the optimal path has an overall delay of at most D, and a total cost of all links along the optimal path is minimized to a value OPT, the method comprising:

maintaining a range [L, U] for OPT, wherein L is a lower bound and U is an upper bound;

setting an initial value of L;

setting an initial value of U to a value corresponding to an expected greatest cost;

setting a cost value V corresponding to $\sqrt{U \cdot L}$ scaling a given cost c of each link from c to c', wherein c' corresponds to $c(n/V\epsilon)$, and $\epsilon > 0$;

determining if a feasible path exists having a delay of at most D and a total cost of at most V and, if no feasible path exists, then increasing the value of L and returning to the cost value setting and the link cost scaling steps;

decreasing the value of U and continuing to increase the value of L until U/L<2 and a feasible path continues to exist; and identifying the links of the feasible path as the optimal path.

2. The method of claim 1, including choosing $\epsilon \leq 1$.

3. The method of claim 1, including setting the initial value of L to unity.

4. The method of claim 1, including setting the initial value of U according to a known maximum cost C for one or more links in the network, and the number n of nodes in the network.

5. The method of claim 1, including rounding the cost value V according to $\lceil \sqrt{U \cdot L} \rceil$.

6. The method of claim 1, including rounding the scaled link cost c' according to $\lfloor cn/V\epsilon \rfloor$.

7. The method of claim 1, including rounding a last-scaled link cost c' according to $\lfloor cn/V\epsilon \rfloor$.

8. The method of claim 1, including increasing the value of L substantially equal to V while determining if a feasible path exists.

9. The method of claim 1, including decreasing the value of U substantially equal to $(1+\epsilon)V$ while determining if a feasible path exists.

10. The method of claim 1, wherein L, U and V are set to integer values.

11. The method of claim 1, including determining actual costs for the links of the optimal path by scaling back the last-scaled link costs from c' to c, wherein c corresponds to $c'(V\epsilon/n)$.

* * * * *